Patented July 25, 1944

2,354,320

UNITED STATES PATENT OFFICE 2,354,320

INTERFACE MODIFYING SUBSTANCE

Joseph W. Johnson, Middleton, Mass., assignor to United Shoe Machinery Corporation, Flemington, N. J., a corporation of New Jersey No Drawing. Application September 28, 1940, Serial No. 358,940

6 Claims. (Cl. 260—404)

This invention relates to compounds for emulsifying and other interface modifying purposes and more particularly to a new class of chemical substances therefor.

Objects of this invention are to produce substances having advantageous properties for emulsifying and other interface modifying purposes and to provide methods of preparing the same.

By the present invention and in pursuance of the above and other objects, I have provided substances exhibiting low interfacial tension between the internal and external phases of an emulsion. By the use of such substances as emulsifying agents, emulsions readily may be prepared, and the resulting emulsions are of enhanced stability and contain dispersed particles of substantially smaller size than heretofore usually encountered. Such substances, moreover, under suitable conditions, may be used as emulsifying agents both for the so-called oil-in-water, and water-in-oil types of emulsions.

Under ionizing conditions, substances according to the present invention provide a colloidal cation, as distinguished for example from ordinary soaps which provide a colloidal anion. As a result of such colloidal cationic phenomenon, substances according to the present invention possess a number of advantageous characteristics. Thus, emulsions prepared with substances of this invention are stable in contact with an acid or with a material carrying a positive charge on its surface. This property is of great advantage when it is desired to cause such an emulsion to penetrate into a material carrying a positive charge on its surface (such as leather under ordinary conditions) without breaking the emulsion. On the other hand, a further advantage of the colloidal cationic characteristic of a substance according to this invention is that an emulsion prepared therewith may be precipitated on material carrying a negative charge on its surface (such as cellulose when in contact with water). Thus, liquids which it is desired to precipitate on the surface of textile fabrics composed of cellulose may be emulsified with the aid of substances according to this invention, and the emulsions applied to cellulose fabric with the consequent uniform precipitation of the emulsified liquid over the surface of the fabric.

Substances according to my invention exhibit a particular advantage in the preparation of emulsions containing chlorinated hydrocarbons as one phase and water as the other phase, in that hydrolysis of the chlorinated hydrocarbon is inhibited. This is probably due to the presence of a chloride anion from substances of the invention, rather than to any characteristic of the cation portion of such substances.

Substances of this invention may vary in their solubility or dispersibility. Generally, however, such substances are soluble in oils, but are only colloidally dispersible rather than truly soluble in water.

Chemically, the substances according to the present invention and having the properties referred to hereinabove are esters, which broadly may be defined as higher aliphatic acid esters of alkanolamine hydrochlorides. The acids from which esters contemplated by this invention may be derived more specifically may be referred to as aliphatic monocarboxylic acids containing 10 to 22 carbon atoms. Examples of such acids are stearic, oleic, linoleic, linolenic, and ricinoleic acids, which respectively are examples of saturated aliphatic acids, unsaturated aliphatic acids with one double bond, unsaturated aliphatic acids with two double bonds, unsaturated aliphatic acids with three double bonds, and hydroxy-aliphatic acids. The alkanolamines from which the esters are derived may be mono- or di-substituted with ethanol, propanol or butanol groups, for example, monoethanolamine, diethanolamine, diethylaminoethanol which is a substituted ethanolamine, and butanolamines. Such mono- or di-substituted alkanolamines may also be defined as alkanolamines wherein at least one of the hydrogen atoms of the amino group is unsubstituted and wherein each alkanol group present contains from two to four carbon atoms. A specific example of a preferred substance coming within the scope of this invention is the oleic acid ester of monoethanolamine hydrochloride, namely, $C_{17}H_{33}COOCH_2CH_2NH_3Cl$. The formula for this substances may also be written $$C_{17}H_{33}COOCH_2CH_2NH_2HCl$$

Further in accordance with the present invention, the above-described higher aliphatic acid esters of alkanolamine hydrochlorides advantageously may be prepared from alkanolamines and acid chlorides. Thus, an alkanolamine may be treated with an equimolar quantity of water to form alkanolammonium hydroxide. The resulting alkanolammonium hydroxide then may be treated with an equimolar quantity of anhydrous gaseous hydrogen chloride at a temperature below 100° C. Water in the product of this reaction is then removed, and alkanolamine hydrochloride crystallized out. For reaction with said alkanolamine hydrochloride, the acid chloride of a monocarboxylic acid containing from 10 to 22 carbon atoms is prepared in any suitable manner. Said acid chloride is then reacted under vacuum with the alkanolamine hydrochloride to form the ester of said monocarboxylic acid and alkanolamine hydrochloride.

As mentioned hereinabove, a specific example of an ester within the scope of the present invention is the oleic acid ester of monoethanolamine hydrochloride. A preferred mode of manufacture of this substance will now be described.

Reaction A

A suitable number of gram mols, for example 13 gram mols of monoethanolamine (technical) (806 grams), are placed in a flask and mixed with an equimolar quantity (13 gram mols) of water (234 grams) at room temperature. The product is 13 gram mols of monoethanolammonium hydroxide (1040 grams). The resulting reaction is illustrated by the following equation:

$$HOCH_2CH_2NH_2 + H_2O \rightarrow HOCH_2CH_2NH_3OH$$

Reaction B

Anhydrous gaseous hydrogen chloride is bubbled into a flask containing the above-described monoethanolammonium hydroxide to which has been added an indicator to hydroxide, for example, dibromo-o-cresol-sulfon-phthalein which has an end point at 6.8 pH. The flask is provided with a reflux condenser and a thermometer. Stirring means may be utilized to facilitate the quantitative reaction between the gas and the liquid hydroxide.

The hydrogen chloride gas, which is not measured volumetrically, is introduced into the flask while the contents thereof are at room temperature. The reaction between the monoethanolammonium hydroxide and hydrogen chloride is exothermic and the rate of introduction of the gas is controlled so that the temperature within the flask does not rise higher than to 65° to 85° C. Under such conditions none of the hydrogen chloride gas comes out of the flask but all of it is absorbed in the reaction. When the indicator changes color from dark purple to straw yellow the influx of the gas into the flask is stopped. If too much hydrogen chloride has been introduced into the flask the contents of the flask may be brought back to the proper pH value by the addition of very small quantities of monoethanolamine and aqueous hydrochloric acid.

The above procedure is followed so as to obtain the product of the reaction, monoethanolamine hydrochloride, in a crystallizable and anhydrous form. When the amine is merely neutralized with aqueous hydrochloric acid, it is difficult to render the monoethanolamine hydrochloride product anhydrous without bringing about some decomposition thereof. The final product of the process, the ester (see Reaction D), cannot be produced in the presence of water.

The reaction between the monoethanolamine hydroxide and the hydrogen chloride gas may be represented by the following equation:

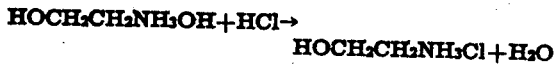

$$HOCH_2CH_2NH_3OH + HCl \rightarrow HOCH_2CH_2NH_3Cl + H_2O$$

The purification and removal of traces of water from the product of the above reaction may be accomplished by mixing said product with anhydrous acetone and then reducing the temperature of the mixture to, for example, minus 20° C. The acetone may then be decanted off. The water present in the reaction product dissolves in the acetone and thereby may be largely removed. It may be noted that water is not substantially extracted by the acetone at room temperatures but it is extracted at low temperatures in the neighborhood of —20° C.

The partially purified reaction product is then washed with fresh anhydrous acetone at room temperature thereby removing any further traces of water.

Residual traces of acetone may be removed by washing the reaction product with ethyl ether. The resulting product is monoethanolamine hydrochloride containing a small amount of ether. While the ether does not take part in the subsequent reactions, it may, if desired, be removed by distilling the reaction product under vacuum at a temperature lower than 100° C. whereby there is produced a pure monoethanolamine hydrochloride.

Reaction C

The monoethanolamine hydrochloride, the preparation of which has been hereinabove described, is to be reacted with oleic acid chloride. While it may be prepared in any suitable manner, one convenient method of preparation of the oleic acid chloride will now be described. 13 gram mols (3669.5 grams) of oleic acid are warmed up to 50° C. and then phosphorus trichloride is slowly added thereto from a dropping funnel, the temperature of the reaction being maintained at about 70° C. which is slightly below the boiling point of phosphorus trichloride.

At the beginning of the reaction the oleic acid becomes much darker and somewhat opaque but during the addition of further phosphorus trichloride the product begins to lighten up again and upon the addition of a still further quantity of phosphorus trichloride the product comes back almost to its original color. Near the end of the reaction some precipitation of phosphorous acid ($H_3PO_3$) is observed as evidenced by a slight turbidity of the product. At this point the reaction product consists of a mixture of oleic acid chloride together with some phosphorous acid and a slight excess of phosphorus trichloride.

The reaction product is then heated to a temperature above the boiling point of phosphorus trichloride (73.5° C.) to a temperature of about 100° C. The excess of phosphorus trichloride boils off strongly and after a minute or two there is a visible precipitation of phosphorous acid. After a few minutes of such boiling the phosphorous acid adheres to the bottom and sides of the flask and the liquid becomes highly transparent and of a light straw color. The product is then cooled down to approximately 50° C. and filtered. The filtrate is then placed under vacuum, warmed up to about 100° C. and kept warm until all evolution of gas ceases.

The chemical change occurring from the above reaction may be illustrated as follows:

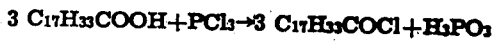

$$3\ C_{17}H_{33}COOH + PCl_3 \rightarrow 3\ C_{17}H_{33}COCl + H_3PO_3$$

Reaction D

The preparation of the oleic acid ester of monoethanolamine hydrochloride from equimolar quantities of monoethanolamine hydrochloride and oleic acid chloride is accomplished by first melting the anhydrous crystals of monoethanolamine hydrochloride in a closed vessel by heating them up to about 65° C. under a strong vacuum (not over about 2.3 cm. of mercury). The oleic acid chloride is then placed in a dropping funnel and dropped into the vessel in vacuo. The oleic acid chloride is added at such a rate that the evolution of gas (hydrogen chloride) is not sufficiently violent to throw the materials out of the vessel. The hydrogen chloride gas evolved is eliminated through the vacuum pump.

The addition of oleic acid chloride is continued until all of it has been added. Meanwhile the temperature in the vessel increases over the 65° C. to which it has been heated. When all of the oleic acid chloride has been added the reaction mass continues to evolve gaseous hydrogen chloride and the temperature is gradually brought up to about 140° C. When the temperature of 140° C. is reached the evolution of gas usually stops suddenly. The cessation of the evolution of gas is the end point of the reaction. The product oleic acid ester of monoethanolamine hydrochloride is then cooled down under vacuum.

The reaction may be expressed as follows:

The ester produced as a result of the above reactions, namely, oleic acid ester of monoethanolamine hydrochloride has a melting point in the neighborhood of 42° to 44° C. and a boiling point above 200° C. under a high vacuum (e. g. about 2 mm.). The ester tends to decompose at temperatures above 200° C. under high vacuum. The ester is soluble generally in paraffin hydrocarbons and chlorinated derivatives thereof and also in benzene, toluene and xylene. The ester is colloidally dispersible but not truly soluble in water.

Generally speaking, the preparation of substances within the scope of this invention may be carried out substantially as described hereinabove for the preparation of the oleic acid ester of monoethanolamine hydrochloride.

In the preparation of the alkanolamine hydrochloride from alkanolammonium hydroxide and anhydrous gaseous hydrogen chloride, the temperature preferably is kept below about 100° C. in order to assure the complete reaction of the alkanolammonium hydroxide and the hydrogen chloride and to prevent decomposition of the hydrochloride.

It is generally desirable, in preparing the ester from the acid chloride and alkanolamine hydrochloride, to keep the hydrochloride and the reaction mixture molten, but to maintain a temperature not greatly in excess thereof. Excessively high temperatures may result in the decomposition of the unreacted alkanolamine hydrochloride.

Further in connection with the preparation of the ester, it is desirable to maintain a high vacuum in order to get a high yield, and to prevent the presence of air, which would react with the ingredients. Moreover, under high vacuum the reaction may be caused to take place at substantially lower temperatures than at atmospheric pressure, and consequently with much less likelihood of decomposition of the ingredients or of the ultimate product.

In carrying out the present invention, mixtures of ingredients may be employed, rather than the pure compounds. Thus, instead of a pure alkanolamine, commercial triethanolamine might be employed, with, in many cases, a substantial saving in cost. As is well known, commercial triethanolamine contains substantial quantities of monoethanolamine and diethanolamine.

Moreover, the acid chlorides may be prepared from mixtures of ingredients within the scope of this invention, rather than from pure ingredients. Thus, the acid chlorides may be prepared from acids derived from natural animal and vegetable oils. For example, the hydrolysis of castor oil results in the production primarily of ricinoleic acid, together with substantial quantities of oleic, linoleic, stearic and other acids, the mixture of which acids advantageously may be employed in carrying out the present invention.

The naturally occurring animal and vegetable oils, the hydrolysis of which results in mixtures of acids suitable for carrying out the present invention include the following: castor oil, coconut oil, cod liver oil, corn oil, cotton seed oil, hemp seed oil, lard oil, linseed oil, menhaden oil, neatsfoot oil, olive oil, palm oil, rape seed oil, soya bean oil, sunflower seed oil, and tung oil.

For the preparation of emulsions by the use of esters of this invention, an amount of ester is used which is in the neighborhood of ¼% to 1% of the total emulsion. Since the ester has a specific gravity in the neighborhood of 1, the percentage may be taken on the basis of either weight or volume. In the case of relatively dilute emulsions, the ester is preferably present in larger proportion, such as 5 to 6% of the dispersed phase. The ester is preferably incorporated in the material which is to form the "oil" or non-aqueous phase of the emulsion, in which the ester will be soluble. The material which is to constitute the continuous phase ("water" or "oil" phase) of the emulsion is preferably stirred, mechanically or otherwise, and the material to constitute the dispersed phase added thereto.

Having described my invention, what I claim as new and desire to secure by Letters Patent of the United States is:

1. The method of preparing chemical substances having emulsifying and other interface modifying properties which comprises providing an anhydrous alkanolamine hydrochloride wherein at least one of the hydrogen atoms of the amino group is unsubstituted and wherein each alkanol group present contains from two to four carbon atoms, condensing said anhydrous alkanolamine hydrochloride under vacuum with the acid chloride of a monocarboxylic acid containing from 10 to 22 carbon atoms to form the ester of said acid and alkanolamine hydrochloride.

2. The method of preparing chemical substances having emulsifying and other interface modifying properties which comprises providing an anhydrous monoalkanolamine hydrochloride of the group consisting of monoethanolamine, monopropanolamine and monobutanolamine hydrochlorides and condensing said anhydrous monoalkanolamine hydrochloride under vacuum with the acid chloride of an aliphatic monocarboxylic acid containing from 10 to 22 carbon atoms to form the ester of said acid and monoalkanolamine hydrochloride.

3. The method of preparing chemical substances having emulsifying and other interface modifying properties which comprises condensing anhydrous monoethanolamine hydrochloride under vacuum with oleic acid chloride to form the oleic acid ester of monoethanolamine hydrochloride.

4. The method of preparing chemical substances having emulsifying and other interface modifying properties which comprises providing an alkanolamine wherein at least one of the hydrogen atoms of the amino group is unsubstituted and wherein each alkanol group present contains from two to four carbon atoms, treating said alkanolamine with an equimolar quantity of water to form the corresponding alkanolammonium hydroxide, treating said alkanolammonium hydroxide with an equimolar quantity of anhydrous gaseous hydrogen chloride at a temperature below 100° C., removing water from the resulting reaction product and crystallizing out anhydrous alkanolamine hydrochloride, and condensing said anhydrous alkanolamine hydrochloride under vacuum with the acid chloride of a monocarboxylic acid containing from 10 to 22 carbon atoms to form the ester of said acid and alkanolamine hydrochloride.

5. The method of preparing chemical substances having emulsifying and other interface modifying properties which comprises providing a mono-alkanolamine of the group consisting of monoethanolamine, monopropanolamine and monobutanolamine, treating said monoalkanolamine with an equimolar quantity of water to form the corresponding alkanolammonium hydroxide, treating said alkanolammonium hydroxide with an equimolar quantity of anhydrous gaseous hydrogen chloride at a temperature below 100° C., removing water from the resulting reaction product and crystallizing out anhydrous alkanolamine hydrochloride, and condensing said alkanolamine hydrochloride under vacuum with the acid chloride of an aliphatic monocarboxylic acid containing from 10 to 22 carbon atoms to form the ester of said acid and alkanolamine hydrochloride.

6. The method of preparing chemical substances having emulsifying and other interface modifying properties which comprises treating monoethanolamine with an equimolar quantity of water to form monoethanolammonium hydroxide, treating said monoethanolammonium hydroxide with an equimolar quantity of anhydrous gaseous hydrogen chloride at a temperature below 100° C., removing water from the resulting reaction product and crystallizing out anhydrous monoethanolamine hydrochloride, and condensing said anhydrous monoethanolamine hydrochloride under vacuum with oleic acid chloride to form the oleic acid ester of monoethanolamine hydrochloride.

JOSEPH W. JOHNSON.